US008619795B2

(12) United States Patent
Yu et al.

(10) Patent No.: US 8,619,795 B2
(45) Date of Patent: Dec. 31, 2013

(54) WIRELESS COMMUNICATION SYSTEM USING MULTIPLE-SERVING NODES

(75) Inventors: Yi Yu, Irving, TX (US); Rose Qingyang Hu, Allen, TX (US); Sam Zhijun Cai, Euless, TX (US); James Jim Womack, Bedford, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 428 days.

(21) Appl. No.: 12/759,422

(22) Filed: Apr. 13, 2010

(65) Prior Publication Data

US 2011/0249620 A1 Oct. 13, 2011

(51) Int. Cl.
*H04L 12/28* (2006.01)

(52) U.S. Cl.
USPC ........................................................ 370/401

(58) Field of Classification Search
USPC .................................. 370/310–350, 400, 401
See application file for complete search history.

(56) References Cited

U.S. PATENT DOCUMENTS

| 6,141,533 | A * | 10/2000 | Wilson et al. ................. 455/11.1 |
| 7,400,856 | B2 * | 7/2008 | Sartori et al. ...................... 455/7 |
| 2005/0049821 | A1 * | 3/2005 | Sahinoglu ...................... 702/150 |
| 2006/0126577 | A1 * | 6/2006 | Yano et al. ...................... 370/337 |
| 2006/0205408 | A1 | 9/2006 | Nakagawa et al. |
| 2007/0275657 | A1 * | 11/2007 | Chang et al. ....................... 455/9 |
| 2008/0123601 | A1 | 5/2008 | Malladi et al. |
| 2008/0200202 | A1 | 8/2008 | Montojo et al. |
| 2009/0003272 | A1 | 1/2009 | Payne et al. |
| 2009/0080366 | A1 | 3/2009 | Shao et al. |
| 2009/0201885 | A1 * | 8/2009 | Kuroda et al. ................. 370/335 |
| 2009/0274048 | A1 | 11/2009 | Sambhwani et al. |
| 2009/0316626 | A1 * | 12/2009 | Lee et al. ........................ 370/328 |
| 2010/0022190 | A1 | 1/2010 | Laroia et al. |
| 2011/0122806 | A1 * | 5/2011 | Huang et al. .................... 370/315 |
| 2011/0199919 | A1 | 8/2011 | Lin et al. |

FOREIGN PATENT DOCUMENTS

| EP | 2026625 A2 | 2/2009 |
| WO | WO2008115649 A1 | 9/2008 |
| WO | WO2010005951 A2 | 1/2010 |

OTHER PUBLICATIONS

Yu, Yi, et al.; U.S. Appl. No. 12/759,383, filed Apr. 13, 2010; Title: Wireless Communication System Using Multiple-Serving Nodes.
3GPP TS 36.331 V8.8.0; 3rd Generation Parnership Project; Technical Specification Group Radio Acess Network; Envolved Universal Terrestrial Radio Access (E-UTRA); Radio Resource Control (RRC); Protocol Specificaiton; Release 8; Dec. 2009; 211 pages.

(Continued)

*Primary Examiner* — Ricky Ngo
*Assistant Examiner* — Wei-Po Kao
(74) *Attorney, Agent, or Firm* — Conley Rose, P.C.; Maria Sekul; J. Robert Brown, Jr.

(57) ABSTRACT

Methods, devices and systems for a wireless communication system using multiple-serving nodes are provided. In one embodiment, a method of wireless communication comprises sending from a first node a downlink control signal to a wireless device using a first communication link; receiving by said first node an uplink control signal from said wireless device via a second node using a third communication link; and forwarding by said first node another downlink control signal from said second node to said wireless device using said third communication link and said first communication link.

15 Claims, 15 Drawing Sheets

(56) References Cited

OTHER PUBLICATIONS

3GPP TS 36.213 V8.6.0; 3rd Generation Parnership Project; Technical Specification Group Radio Access Network; Envolved Universal Terrestrial Radio Access (E-UTRA); Physical Layer Procedures; Release 8; Mar. 2009; 77 pages.

3GPP TR 36.814 V0.4.1; 3rd Generation Parnership Project; Technical Specification Group Radio Access Network; Further Advancements for E-UTRA; Physical Layer Aspects; Release 9; Feb. 2009; 31 pages.

3GPP TS 36.300 V8.8.0; 3rd Generation Parnership Project; Technical Specification Group Radio Access Network; Envolved Universal Terrestrial Radio Access (E-UTRA) and Evlolved Universal Terrestrial Radio Access Newtork (E-UTRAN); Overall Descritpion; Stage 2; Release 8; Mar. 2009; 156 pages.

3GPP TS 36.304 V8.8.0; 3rd Generation Parnership Project; Technical Specification Group Radio Access Network; Envolved Universal Terrestrial Radio Access (E-UTRA); User Equipment (UE) Procedures in Idle Mode; Release 8; Dec. 2009; 30 pages.

3GPP TSG RAN WG1 Meeting #57bis; Type-II Relay Referenced Signal Transmission and UE Association; R1-092419; Los Angleles, USA; Jun. 29-Jul. 3, 2009; 4 pages.

European Extended Search Report; Application No. 10173132.1; Oct. 27, 2010; 10 pages.

PCT International Search Report; Application No. PCT/US2011/031744; Jun. 21, 2011; 2 pages.

PCT Written Opinion of the International Searching Authority; Application No. PCT/US2011/031744; Jun. 21, 2011; 7 pages.

PCT International Search Report; Application No. PCT/US2011/031746; Jul. 7, 2011; 2 pages.

PCT Written Opinion of the International Searching Authority; Application No. PCT/US2011/031746; Jul. 7, 2011; 7 pages.

European Search Report, EP 10 17 3130, Oct. 14, 2010.

3rd Generation Partnership Project; Technical Specification Group Radio Access Network; Evolved Universal Terrestrial Radio Access (E-UTRA); Physical Channels and Modulation (Release 9), 3GPP TS 36.211 V9.1.0, Mar. 2010.

Office Action dated Jul. 5, 2012; U.S. Appl. No. 12/759,383, filed Apr. 13, 2010; 25 pages.

European Intent To Grant; Application No. 10173130.5; Aug. 6, 2012; 8 pages.

Final Office Action dated Mar. 18, 2013; U.S. Appl. No. 12/759,383, filed Apr. 13, 2010; 19 pages.

Advisory Action dated Jun. 3, 2013; U.S. Appl. No. 12/759,383, filed Apr. 13, 2010; 3 pages.

Office Action dated Jun. 21, 2013; U.S. Appl. No. 12/759,383, filed Apr. 13, 2010; 28 pages.

\* cited by examiner

WIRELESS COMMUNICATION SYSTEM USING MULTIPLE-SERVING NODES

CROSS-REFERENCE TO RELATED APPLICATIONS

There are no related applications.

FIELD

The invention generally relates to wireless communication and in particular to a wireless communication system using multiple-serving nodes.

BACKGROUND

Wireless communication systems are widely deployed to provide, for example, a broad range of voice and data-related services. Typical wireless communication systems consist of multiple-access communication networks that allow users to share common network resources. Examples of these networks are time division multiple access ("TDMA") systems, code division multiple access ("CDMA") systems, single-carrier frequency division multiple access ("SC-FDMA") systems, orthogonal frequency division multiple access ("OFDMA") systems, or other like systems. An OFDMA system is adopted by various technology standards such as evolved universal terrestrial radio access ("E-UTRA"), Wi-Fi, worldwide interoperability for microwave access ("WiMAX"), ultra mobile broadband ("UMB"), and other similar systems. Further, the implementations of these systems are described by specifications developed by various standards bodies such as the third generation partnership project ("3GPP") and 3GPP2.

As wireless communication systems evolve, more advanced network equipment is introduced that provide improved features, functionality, and performance. A representation of such advanced network equipment may also be referred to as long-term evolution ("LTE") equipment or long-term evolution advanced ("LTE-A") equipment. LTE is the next step in the evolution of high-speed packet access ("HSPA") with higher average and peak data throughput rates, lower latency and a better user experience especially in high-demand urban areas. LTE accomplishes this higher performance with the use of broader spectrum bandwidth, OFDMA and SC-FDMA air interfaces, and advanced antenna methods. Uplink ("UL") refers to communication from a wireless device to a node. Downlink ("DL") refers to communication from a node to a wireless device.

For a wireless communication system using a relay node ("RN"), a wireless device may have difficulties selecting between a base station and the RN due to, for instance, UL and DL power imbalance. An RN such as an LTE Type-I RN can operate as a smaller base station. In an LTE system, a wireless device may choose a base station or RN based on the average DL signal strength, which may result in lower signal strength on the UL due to the UL/DL power imbalance. Alternatively, the wireless device may choose the base station or RN based on both DL and UL signal strengths.

As described in the LTE-A standard, a Type-I RN can have full radio resource control ("RRC") functionality. Such RN can control its cell and can have its own physical cell identifier. Further, such RN can transmit its own synchronization channel and reference signal. Also, the wireless device can receive, for instance, scheduling information and hybrid automatic repeat request ("HARQ") feedback from the RN and send control information such as a scheduling request ("SR") signal, channel quality indicator ("CQI") signal and HARQ feedback signal to the RN.

In a heterogeneous LTE-A network using a plurality of base stations and Type-I RNs, such network may have a significant difference between base station transmission power and RN transmission power. A wireless device may provide a UL transmission that is received by a base station and a RN. The received power from such transmission may be substantially dependent on the propagation path between the wireless device and the base station, RN or both. In some circumstances, the wireless device may receive a stronger DL transmission from the base station, while the RN receives a stronger UL transmission from the wireless device, leading to a UL and DL power imbalance. This disclosure describes various embodiments including for resolving such power imbalance in a multiple-serving node wireless communication system.

BRIEF DESCRIPTION OF THE DRAWINGS

To facilitate this disclosure being understood and put into practice by persons having ordinary skill in the art, reference is now made to exemplary embodiments as illustrated by reference to the accompanying figures. Like reference numbers refer to identical or functionally similar elements throughout the accompanying figures. The figures along with the detailed description are incorporated and form part of the specification and serve to further illustrate exemplary embodiments and explain various principles and advantages, in accordance with this disclosure, where.

Figure 1:
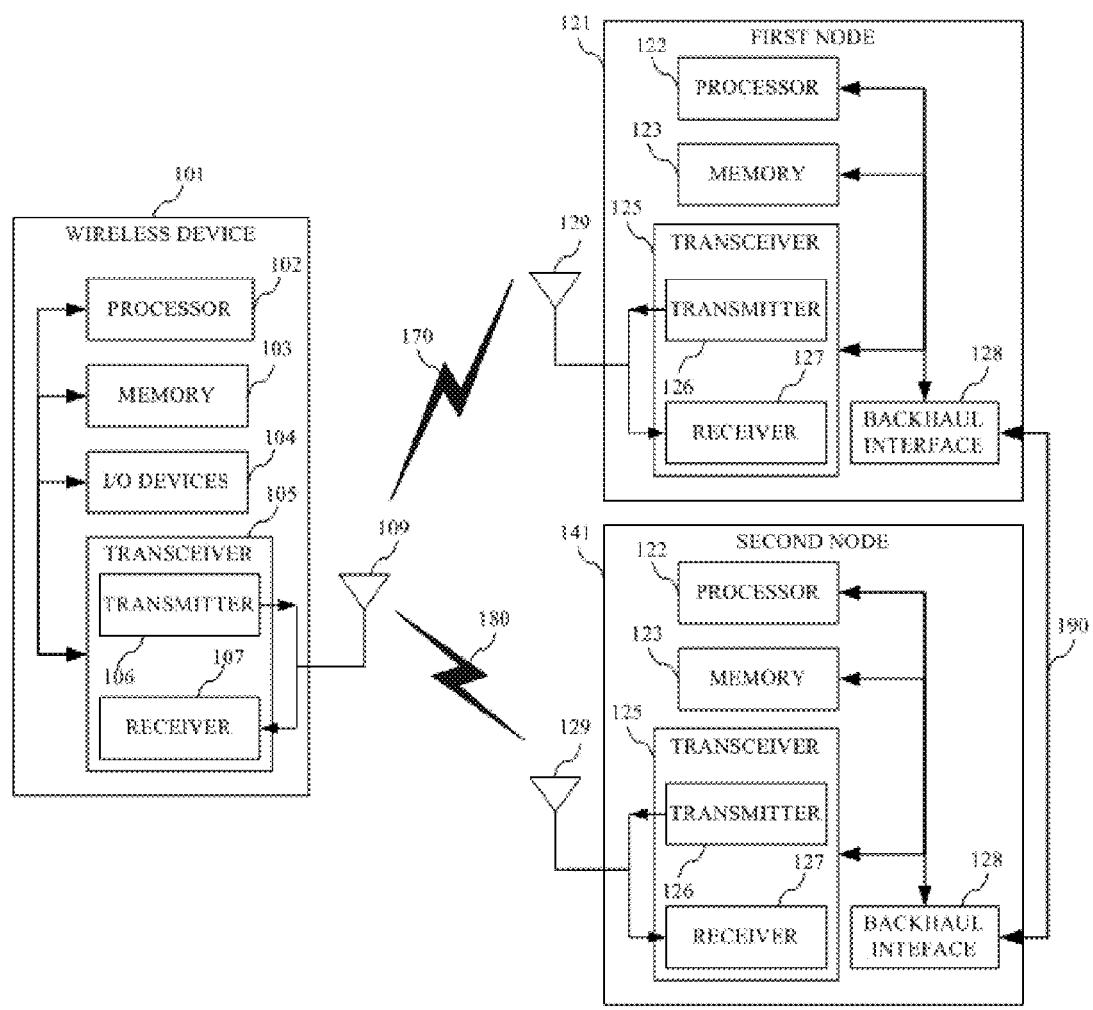
FIG. 1 is a block diagram of one embodiment of a wireless communication system using multiple-serving nodes in accordance with various aspects set forth herein.

Skilled artisans will appreciate that elements in the accompanying figures are illustrated for clarity, simplicity and to further help improve understanding of the embodiments, and have not necessarily been drawn to scale.

DETAILED DESCRIPTION

Although the following discloses exemplary methods, devices and systems for use in wireless communication systems, it may be understood by one of ordinary skill in the art that the teachings of this disclosure are in no way limited to the examplaries shown. On the contrary, it is contemplated that the teachings of this disclosure may be implemented in alternative configurations and environments. For example, although the exemplary methods, devices and systems described herein are described in conjunction with a configuration for aforementioned wireless communication systems, the skilled artisan will readily recognize that the exemplary methods, devices and systems may be used in other systems and may be configured to correspond to such other systems as needed. Accordingly, while the following describes exemplary methods, devices and systems of use thereof, persons of ordinary skill in the art will appreciate that the disclosed examplaries are not the only way to implement such methods, devices and systems, and the drawings and descriptions should be regarded as illustrative in nature and not restrictive.

Various techniques described herein can be used for various wireless communication systems. The various aspects described herein are presented as methods, devices and systems that can include a number of components, elements, members, modules, nodes, peripherals, or the like. Further, these methods, devices and systems can include or not include additional components, elements, members, modules, nodes, peripherals, or the like. In addition, various aspects described herein can be implemented in hardware, firmware, software or any combination thereof. It is important to note that the terms "network" and "system" can be used interchangeably. Relational terms described herein such as "above" and "below", "left" and "right", "first" and "second", and the like may be used solely to distinguish one entity or action from another entity or action without necessarily requiring or implying any actual such relationship or order between such entities or actions. The term "or" is intended to mean an inclusive "or" rather than an exclusive "or." Further, the terms "a" and "an" are intended to mean one or more unless specified otherwise or clear from the context to be directed to a singular form. It is important to note that the terms "network" and "system" can be used interchangeably.

Wireless communication networks typically consist of a plurality of wireless devices and a plurality of nodes. A node may also be called a base station, node-B ("NodeB"), base transceiver station ("BTS"), access point ("AP"), cell, relay node ("RN"), serving node or some other equivalent terminology. Further, the term "cell" can include a specific base station, a specific sector of a base station, a specific antenna of a sector of a base station. A base station typically contains one or more radio frequency ("RF") transmitters and receivers to communicate with wireless devices. Further, a base station is typically fixed and stationary. For LTE and LTE-A equipment, the base station is also referred to as an E-UTRAN NodeB ("eNB").

A wireless device used in a wireless communication network may also be referred to as a mobile station ("MS"), a terminal, a cellular phone, a cellular handset, a personal digital assistant ("PDA"), a smartphone, a handheld computer, a desktop computer, a laptop computer, a tablet computer, a set-top box, a television, a wireless appliance, or some other equivalent terminology. A wireless device may contain one or more RF transmitters and receivers, and one or more antennas to communicate with a base station. Further, a wireless device may be fixed or mobile and may have the ability to move through a wireless communication network. For LTE and LTE-A equipment and for various industry standards, the wireless device is also referred to as user equipment ("UE").

FIG. 1 is a block diagram of one embodiment of wireless communication system 100 using multiple-serving nodes in accordance with various aspects set forth herein. In FIG. 1, system 100 can include a wireless device 101, a first node 121 and a second node 141. In FIG. 1, wireless device 101 can include processor 102 coupled to memory 103, input/output devices 104, transceiver 105 or any combination thereof, which can be utilized by wireless device 101 to implement various aspects described herein. Transceiver 105 of wireless device 101 can include one or more transmitters 106 and one or more receivers 107. Further, associated with wireless device 101, one or more transmitters 106 and one or more receivers 107 can be connected to one or more antennas 109.

In FIG. 1, first node 121 can include processor 122 coupled to memory 123 and transceiver 125. Transceiver 125 of first node 121 can include one or more transmitters 126 and one or more receivers 127. Further, associated with first node 121, one or more transmitters 126 and one or more receivers 127 can be connected to one or more antennas 129.

Similarly, second node 141 can include processor 122 coupled to memory 123 and transceiver 125. Transceiver 125 of second node 141 includes one or more transmitters 126 and one or more receivers 127. Further, associated with second node 141, one or more transmitters 126 and one or more receivers 127 are connected to one or more antennas 129.

In this embodiment, wireless device 101 can communicate with first node 121 using one or more antennas 109 and 129, respectively, over first communication link 170, and can communicate with second node 141 using one or more antennas 109 and 129, respectively, over second communication link 180. Further, first node 121 can communicate with second node 141 using backhaul interfaces 128 over third communication link 190. First communication link 170 supports the communication of signals between wireless device 101 and first node 121. Second communication link 180 supports the communication of signals between wireless device 101 and second node 141. Third communication link 190 supports the communication of signals between first node 121 and second node 141. First communication link 170, second communication link 180 and third communication link 190 can support, for instance, sending a DL data signal, UL data signal, DL control signal, UL control signal, other signal or combination of signals. Further, first communication link 170, second communication link 180 and third communication link 190 can include a physical channel, a logical channel, other channel or any combination thereof. First communication link 170 and second communication link 180 can use, for instance, any wireless communication protocol supporting technologies associated with, for instance, TDMA, CDMA, UMTS, Wi-MAX, LTE, LTE-A, Wi-Fi, Bluetooth or other similar technology. Third communication link 190 can use any wired communication protocol, wireless communication protocol or both.

In this embodiment, first node 121, second node 141 or both can communicate a DL data signal, UL data signal, DL control signal, UL control signal, other signal or any combination thereof with wireless device 101. Therefore, such embodiment can allow wireless device 101 to use, for instance, the same or different nodes 121 and 141 to communicate a DL data signal, UL data signal, DL control signal, UL control signal, other signal or any combination thereof. Determination of which node 121 and 141 to use for any such signals can be determined using, for instance, a received signal strength, data throughput rate, bit error rate ("BER"), word error rate ("WER"), other similar metric or combination of metrics.

For example, first node 121 can send a DL control signal to wireless device 101 using first communication link 170. Once received, processor 102 of wireless device 101 can process the received DL control signal, can generate a response, and can provide such response to first node 121 using, for instance, a UL control signal of first communication link 170.

In another example, wireless device 101 can send a UL control signal to second node 141 using second communication link 180. Once received, processor 142 of second node 141 can forward such signal to first node 121 using third communication link 190.

Figure 2:
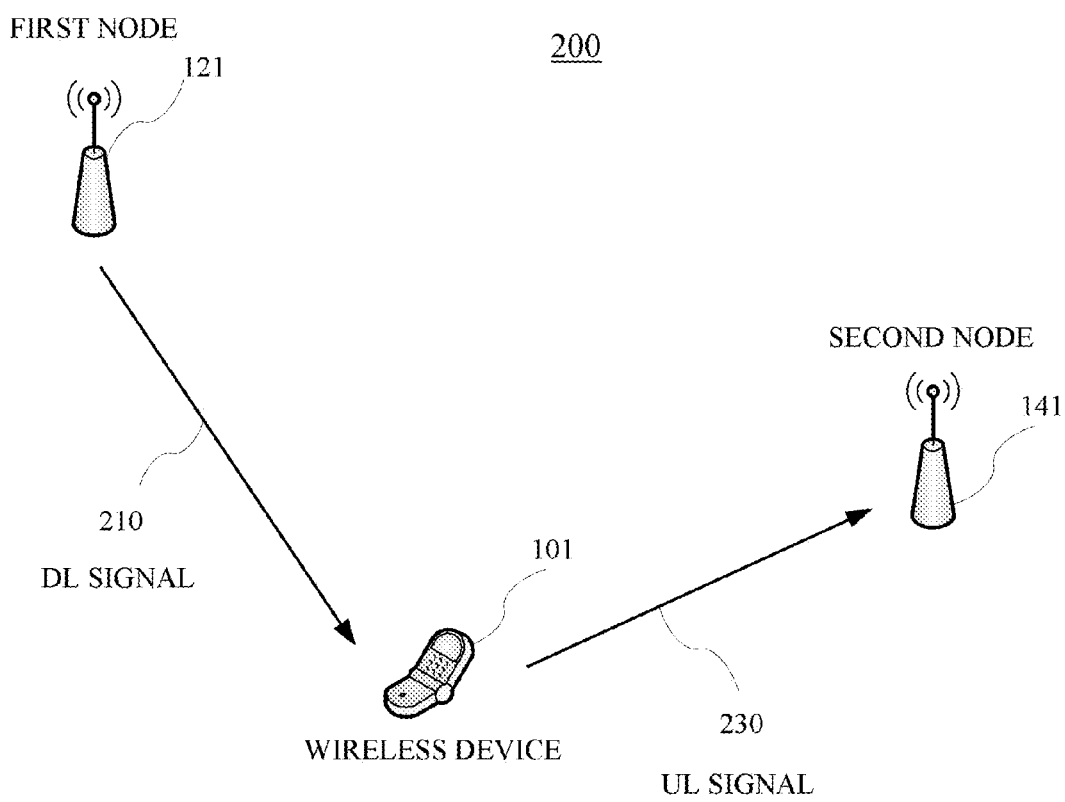
FIG. 2 illustrates one embodiment of a channel structure in a wireless communication system using multiple-serving nodes in accordance with various aspects set forth herein.

FIG. 2 illustrates one embodiment of channel structure 200 of system 100 in accordance with various aspects set forth herein. In this embodiment, structure 200 can allow first node 121 to provide a DL signal 210 to wireless device 101 using first communication link 170, and can allow wireless device 101 to provide a UL signal 230 to second node 141 using second communication link 180. A DL signal can include a DL data signal, DL control signal, other signal or any combination thereof. An UL signal can include a UL data signal, UL control signal, other signal or any combination thereof. For example, first node 121 can send a DL data signal to wireless device 101 using first communication link 170. Further, structure 200 can allow wireless device 101 to send a UL data signal to second node 141 using second communication link 180. Such configuration can be advantageous when wireless device 101 is in closer proximity to second node 141 than first node 121 but still receiving a strong DL signal from node 121, allowing wireless device 101 to, for instance, operate at a lower transmit power, higher data throughput rate, other benefit or any combination thereof.

In another embodiment, structure 200 can allow first node 121 and second node 141 to be one and the same node. In this configuration, nodes 121 and 141 can act as, for instance, a single serving node as described in 3*rd Generation Partnership Project; Technical Specification Group Radio Access Network; Physical Channels and Modulation (Release* 8), 3GPP, or 3GPP TS 36 series of specifications. It is important to recognize that each node 121 and 141 may send a DL signal to wireless device 101, may receive a UL signal from wireless device 101 or both and may do the same for another wireless device. Further, this disclosure can provide the advantage of allowing full frequency re-use, frequency provisioning or both for each node 121 and 141.

Figure 3:
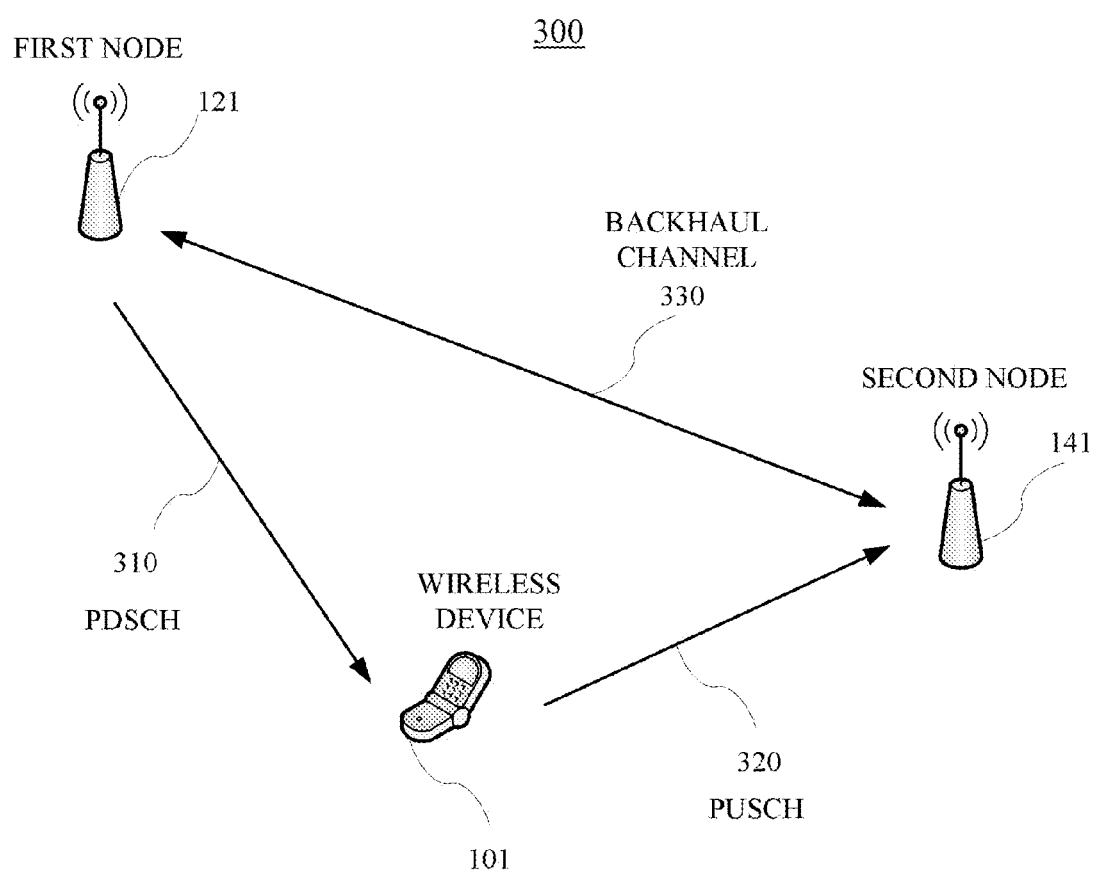
FIG. 3 illustrates another embodiment of a channel structure in a wireless communication system using multiple-serving nodes in accordance with various aspects set forth herein.

FIG. 3 illustrates another embodiment of channel structure 300 of system 100 in accordance with various aspects set forth herein. In FIG. 3, structure 300 can allow first node 121 to send a DL data signal to wireless device 101 using, for instance, a physical DL shared channel ("PDSCH") 310 of first communication link 170. Similarly, system 300 can allow wireless device 101 to send a UL data signal to second node 141 using, for instance, physical UL shared channel ("PUSCH") 320 of second communication link 180. Such configuration can be advantageous by allowing the assignment of PDSCH 310, PUSCH 320 or both based on, for instance, the quality of the associated communication link. However, assigning the sending of a UL data signal and the sending of a DL data signal to different nodes can impact, for instance, the control channel structure of system 300. For example, the control channel structure used in LTE Release 8 is designed for a wireless communication system using single-serving nodes and would need to be modified, as described by this disclosure, to support multiple-serving node wireless communication system 100. For instance, first node 121 may provide a UL grant signal, DL grant signal or both to wireless device 101 using a DL control channel of first communication link 170. Under system 100, such grants may be provided from different nodes 121 and 141, as opposed to the same node. Further, any timing requirements such as the UL timing alignment procedure described in LTE Release 8 may not be supported in system 100 since the transmission of DL signals, UL signals or both may be associated with different nodes. Other issues may exist, for instance, with the configuration and use of UL control channels and DL control channels, including defining the proper control channel to send an acknowledgment or no acknowledgment ("ACK/NACK") signal, sounding reference signal ("SRS") signal, other signal or combination of signals.

Figure 4:
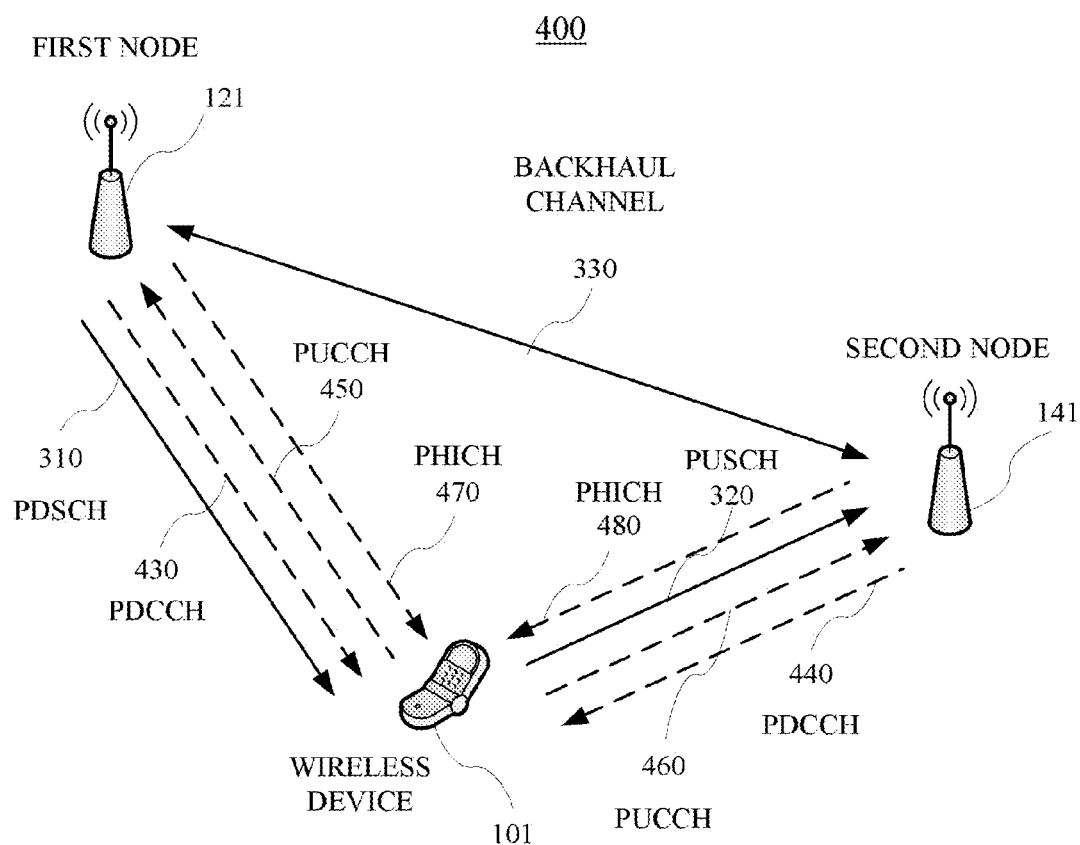
FIG. 4 illustrates one embodiment of an independent control channel structure in a wireless communication system using multiple-serving nodes in accordance with various aspects set forth therein.

This disclosure includes describing two alternative control channel structures to resolve the aforementioned issues. Such alternatives are associated with an independent control channel structure and a distributed control channel structure. FIG. 4 illustrates one embodiment of independent control channel structure 400 of system 100 in accordance with various aspects set forth therein. In FIG. 4, first communication link 170 can include PDSCH 310, physical DL control channel ("PDCCH") 430, physical UL control channel ("PUCCH") 450, physical hybrid automatic repeat request indicator channel ("PHICH") 470, other channel or any combination thereof. Second communication link 180 can include PUSCH 320, PDCCH 440, PUCCH 460, physical hybrid automatic repeat request ("HARQ") indicator channel ("PHICH") 480 or any combination thereof. For communication of data signals, structure 400 can allow first node 121 to provide a DL data signal to wireless device 101 using, for instance, PDSCH 310 of first communication link 170. Further, wireless device 101 can provide a UL data signal to second node 141 using, for instance, PUSCH 320 of second communication link 180. For communication of control signals, structure 400 can allow first node 121 and second node 141 each to have the same or different control channel structure. For example, first node 121 can provide a DL control signal to wireless device 101 using, for instance, PDCCH 430 of first communication link 170. Wireless device 101 can provide a UL control signal to first node 121 using, for instance, PUCCH 450 of first communication link 170. Further, second node 141 can provide a DL control signal to wireless device 101 using, for instance, PDCCH 440, PHICH 480 or both of second communication link 180. Further, wireless device 101 can provide a UL control signal to second node 141 using, for instance, PUCCH 460 of second communication link 180.

Figure 5:
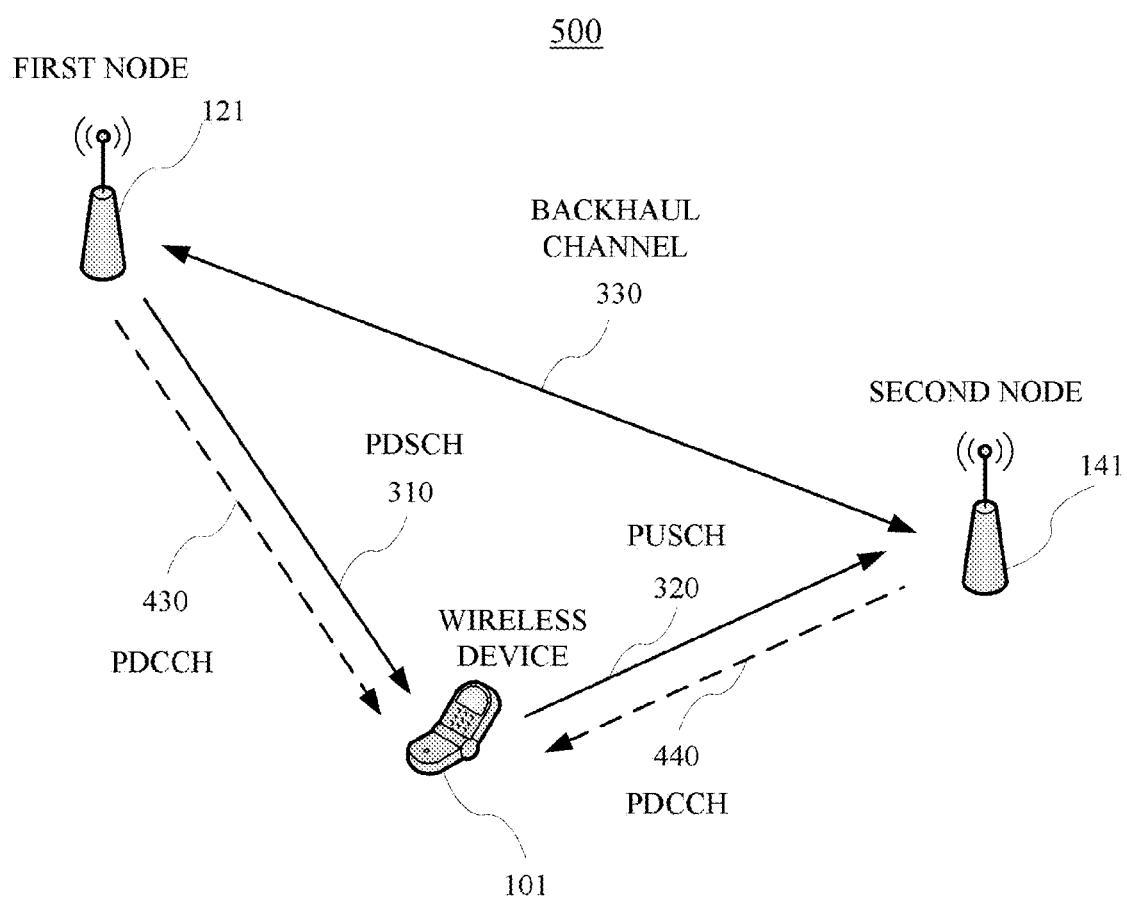
FIG. 5 illustrates another embodiment of the independent control channel structure in a wireless communication system using multiple-serving nodes in accordance with various aspects set forth therein.

FIG. 5 illustrates another embodiment of independent control channel structure 500 of system 100 in accordance with various aspects set forth therein. In FIG. 5, structure 500 can allow first node 121 to provide wireless device 101 a DL control signal using, for instance, PDCCH 430 of first communication link 170. Similarly, structure 500 can allow second node 141 to provide wireless device 101 a DL control signal using, for instance, PDCCH 440 of second communication link 180. It is important to recognize that the DL control signal provided by first node 121 and the DL control signal provided by second node 141 are independent of each other. First node 121 can manage, control, coordinate, schedule or any combination thereof the transmission of a DL data signal to wireless device 101 using, for instance, PDSCH 310 of first communication link 170. Further, second node 141 can manage, control, coordinate, schedule or any combination thereof the transmission of a UL data signal from wireless device 101 using, for instance, PUSCH 320 of second communication link 180. For example, first node 121 can provide a DL grant signal to wireless device 101 using, for instance, PDCCH 430 of first communication link 170. Further, second node 141 can provide a UL grant signal to wireless device 101 using, for instance, PDCCH 440 of second communication link 180. A DL grant signal can provide permission for first node 121 to send a DL data signal to wireless device 101 using, for instance, PDSCH 310 of first communication link 170. A UL grant signal can provide permission for wireless device 101 to send a UL data signal to second node 141 using, for instance, PUSCH 320 of second communication link 180.

Figure 6:
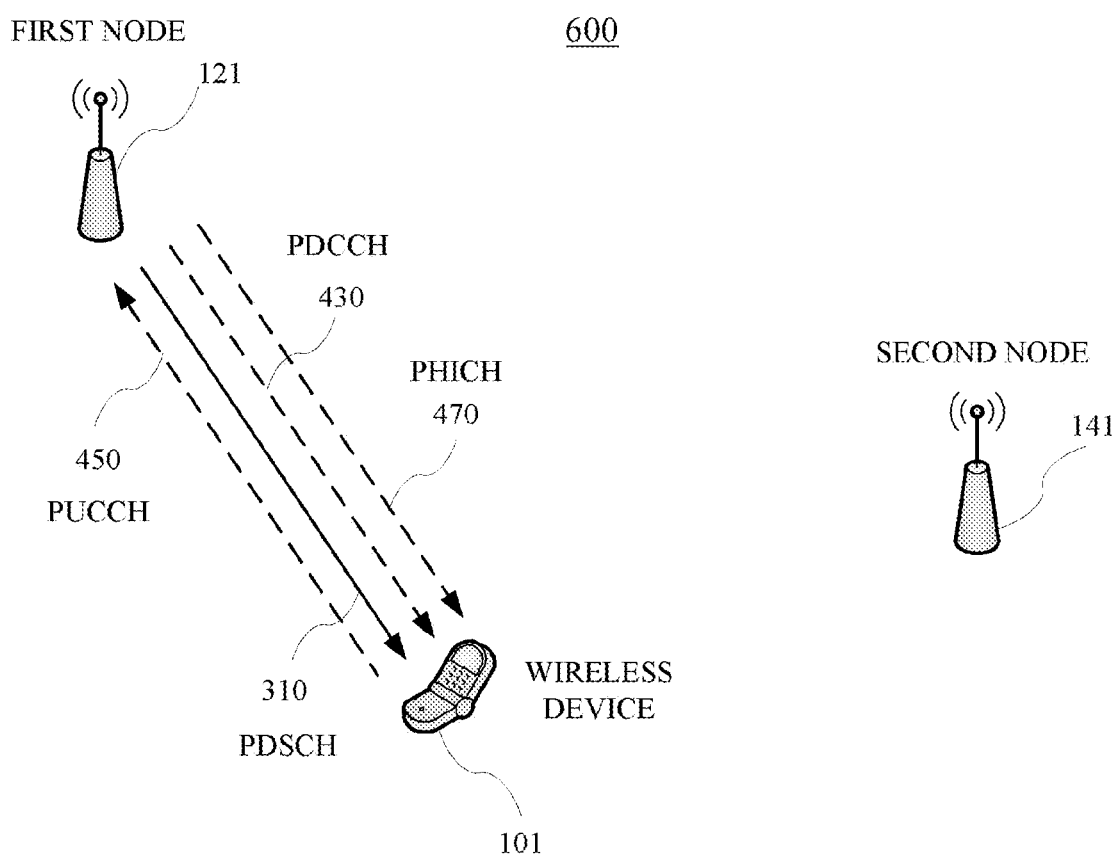
FIG. 6 illustrates another embodiment of an independent control channel structure in a wireless communication system using multiple-serving nodes in accordance with various aspects set forth therein.

FIG. 6 illustrates another embodiment of independent control channel structure 600 of system 100 in accordance with various aspects set forth therein. In FIG. 6, structure 600 can allow first communication link 170 to include PDSCH 310, PDCCH 430, PUCCH 450, other channel or any combination thereof. For instance, wireless device 101 can provide a UL control signal to first node 121 using, for instance, PUCCH 450 of first communication link 170. Such UL control signal can include, for instance, a channel quality indicator ("CQI") signal, pre-coding matrix indicator ("PMI") signal, rank indication ("RI") signal, ACK/NACK signal, other signal or combination of signals. The CQI, PMI, RI and ACK/NACK signals can be used to support, for instance, the transmission from first node 121 of a DL data signal to wireless device 101 using, for instance, PDSCH 310 of first communication link 170. Further, power control signals can be used to support, adjust, adapt, coordinate or any combination thereof the transmission of UL signals from wireless device 101 to first node 121. First node 101 can provide a DL control signal to wireless device 101 using, for instance, PDCCH 430 of first communication link 170, wherein the DL control signal can include a power control signal such as a transmission power control command ("TPC") signal.

Figure 7:
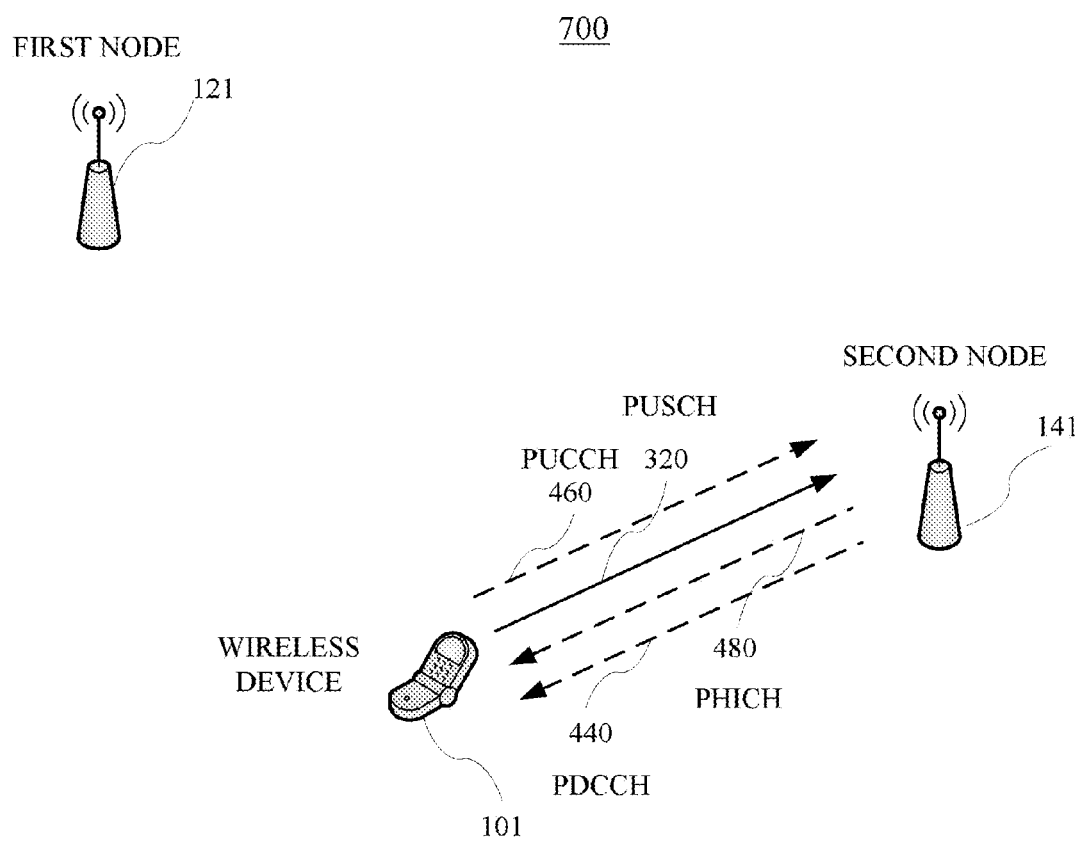
FIG. 7 illustrates another embodiment of an independent control channel structure in a wireless communication system using multiple-serving nodes in accordance with various aspects set forth herein.

FIG. 7 illustrates another embodiment of independent control channel structure 700 of system 100 in accordance with various aspects set forth herein. In FIG. 7, structure 700 can allow second communication link 180 to include PUSCH 420, PDCCH 440, PUCCH 460 and PHICH 480, other channel or any combination thereof. In FIG. 7, structure 700 can allow wireless device 101 to provide a UL control signal to second node 141 using, for instance, PUCCH 460 of second communication link 180. Further, second node 141 can manage, support, coordinate or any combination thereof receiving a UL data signal from wireless device 101 using, for instance, PUSCH 320 of second communication link 180 by providing a DL control signal to wireless device 101 using, for instance, PDCCH 440, PHICH 480 or both of second communication link 180. For example, PHICH 480 of second communication link 180 can be used to deliver, for instance, an ACK/NACK signal from second node 141 to wireless device 101, and PDCCH 440 can be used to deliver, for instance, a UL grant signal, ACK/NACK signal, TPC signal, timing adjustment command signal, other signal or any combination thereof from second node 141 to wireless 101. Further, PUCCH 460 can be used to deliver, for instance, scheduling request ("SR") signal, SRS signal, other signal or any combination thereof from wireless device 101 to second node 141. For example, an SR signal can include the scheduling request indicator ("SRI") signal associated with sending, for instance, a UL data signal from wireless device 101 to second node 141. Further, wireless device 101 can send an SRS signal to second node 141 to allow for timing adjustment, UL transmission adaptation, other benefit or any combination thereof between wireless device 101 and second node 141. It is important to recognize that the transmission of a dedicated SRS signal from wireless device 101 to first node 121 may not be required, since any timing alignment is intended for UL transmissions from wireless device 101 to second node 141. However, the timing alignment required for first node 121 may cause interference with other wireless devices transmitting to first node 121. Knowledge of the UL transmission timing may be useful to mitigate such interference. Therefore, such transmission timing can be estimated using, for instance, the timing of PUCCH 460 transmissions from wireless device 101 to second node 141.

In another embodiment, wireless device 101 may multiplex control signals with data signals using, for instance, PUSCH 320 of second communication link 180, PDSCH 310 of first communication link 170 or both. For example, after receiving a UL data signal and a UL control signal using PUSCH 320, second node 141 may forward the UL control signal to first node 121 using, for instance, backhaul link 330 of third communication link 190. If the UL control signal is an ACK/NACK signal, backhaul link 330 may increase the HARQ re-transmission delay. In order to avoid wasting DL bandwidth, the number of HARQ re-transmission procedure-related processes can be increased to accommodate longer HARQ re-transmission round trip time ("RTT"). For example, the control signals used for independent control channel structure 600 of first communication link 170 are provided in Table 1.

TABLE 1

| CONTROL CHANNEL | CONTROL SIGNAL |
| --- | --- |
| PDCCH 430 | DL grant signal, TPC signal |
| PUCCH 450 | ACK/NACK signal, CQI signal, PMI signal, RI signal |
| PHICH 470 | ACK/NACK signal |

Further, control signals for independent control channel structure 700 of second communication link 180 are provided in Table 2.

TABLE 2

| CONTROL CHANNEL | CONTROL SIGNAL |
|---|---|
| PDCCH 440 | UL grant signal, TPC signal, ACK/NACK signal |
| PUCCH 460 | SR signal, SRS signal |
| PHICH 480 | ACK/NACK signal |

Figure 8:
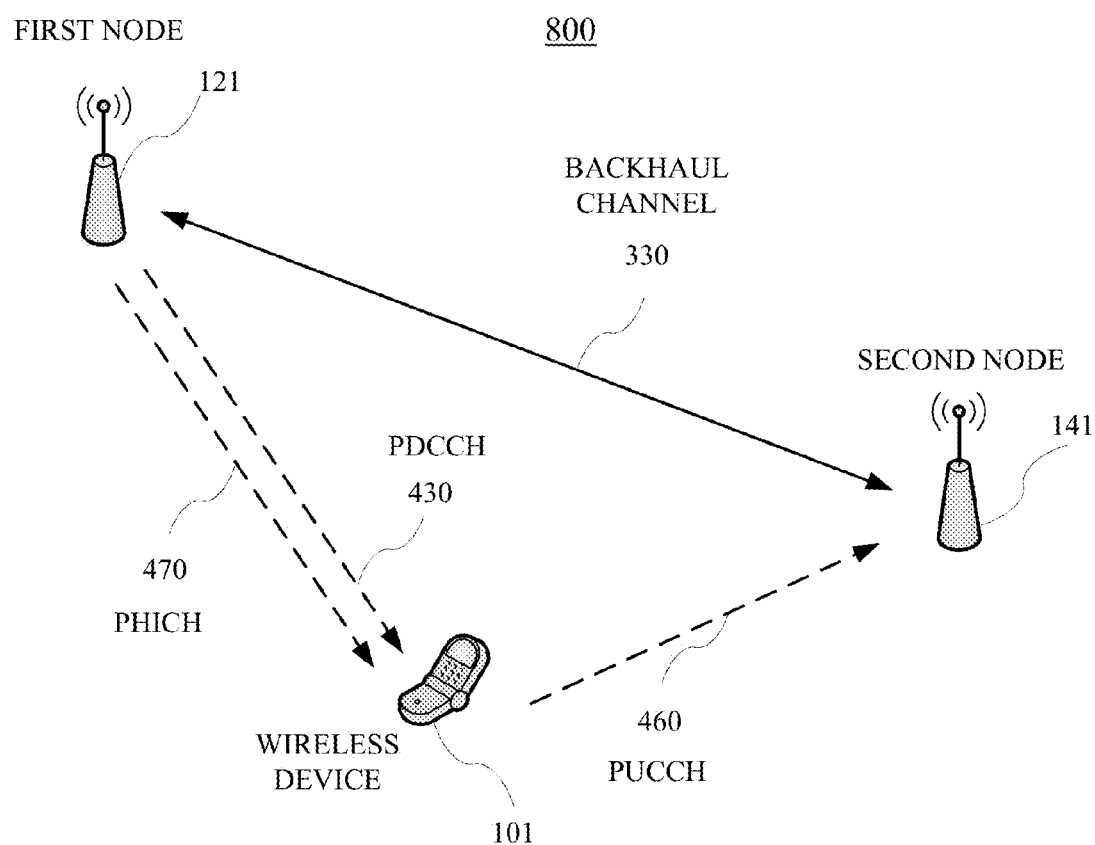
FIG. 8 illustrates one embodiment of a distributed control channel structure in a wireless communication system using multiple-serving nodes in accordance with various aspects set forth herein.

FIG. 8 illustrates one embodiment of distributed control channel structure 800 of system 100 in accordance with various aspects set forth herein. In this embodiment, first node 121 can schedule DL transmissions and second node 141 can schedule UL transmissions for wireless device 101. Further, structure 800 can allow first node 121 to send a DL signal to wireless device 101 using first communication link 170. However, wireless device 101 cannot send a UL signal to first node 121 using first communication link 170. Instead, wireless device 101 can send a UL signal to first node 121 via second node 141 using second communication link 180 and third communication link 190. Similarly, structure 800 can allow wireless device 101 to send a UL signal to second node 141 using second communication link 180. However, second node 141 cannot send a DL signal to wireless device 101 using second communication link 180. Instead, second node can send a DL signal to wireless device 101 via first node 121 using third communication link 190 and first communication link 170. To summarize, any transmission between first node 121 and wireless device 101 using first communication link 170 may only be the transmission of a DL signal from first node 121 to wireless device 101. Further, any transmission between second node 141 and wireless device 101 using second communication link 180 may only be the transmission of a UL signal from wireless device 101 to second node 141. In this embodiment, wireless device 101 can be assigned first node 121, second node 141 or both based on the quality of the corresponding communication link 170 and 180, wherein the quality of communication link 170 and 180 can be determined using, for instance, the received signal strength, signal quality, data throughput rate, bit error rate ("BER"), word error rate ("WER"), other similar metric or any combination thereof. In some embodiments, first node 121 and second node 141 may be the same node.

In FIG. 8, structure 800 can allow wireless device 101 to send a UL control signal to first node 121 via second node 141 using second communication link 180 and third communication link 190, wherein the UL control signal can include, for instance, an ACK/NACK signal, CQI signal, PMI signal, RI signal, other signal or any combination thereof. For example, wireless device 101 can send a UL control signal to second node 141 using, for instance, PUCCH 460 of second communication link 180. Further, second node 141 can forward the UL control signal to first node 121 using, for instance, backhaul channel 330 of third communication link 190.

In FIG. 8, structure 800 can allow second node 141 to send a DL control signal to wireless device 101 via first node 121 using third communication link 190 and first communication link 170, wherein the DL control signal can include, for instance, a UL grant signal, ACK/NACK signal, TPC signal, other control signal or any combination thereof. For example, second node 141 can send a DL control signal to first node 121 using, for instance, backhaul channel 330 of third communication link 190. Further, first node 121 can forward the DL control signal to wireless device 101 using, for instance, PDCCH 430, PHICH 470 or both of first communication link 170. It is important to recognize that careful coordination, management, assignment or any combination thereof of the DL and UL control signals may be required to deliver the correct control signal to the correct node.

Figure 9:
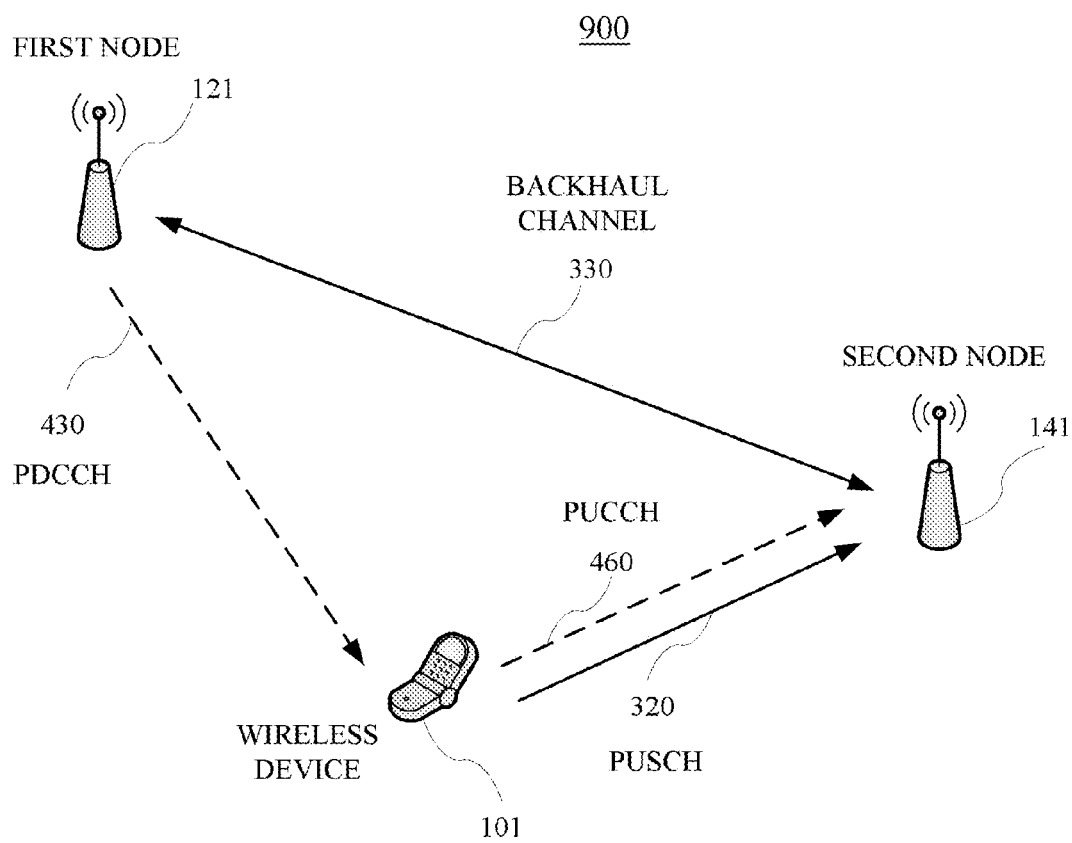
FIG. 9 illustrates another embodiment of a distributed control channel structure in a wireless communication system using multiple-serving nodes in accordance with various aspects set forth herein.

FIG. 9 illustrates another embodiment of distributed control channel structure 900 of system 100 in accordance with various aspects set forth herein. In FIG. 9, structure 900 can allow first node 121 to schedule the transmission of a DL signal from first node 121 to wireless device 101 using first communication link 170 and can allow second node 141 to schedule the transmission of a UL signal from wireless device 101 to second node 141 using second communication link 180. For instance, first node 121 can send a DL signal to wireless device 101 using first communication link 170.

In another embodiment, second node 141 can determine the scheduling of the transmission of a UL signal by wireless device 101 to second node 141 using second communication link 180 and provide such scheduling to first node 121, where first node 121 can provide a corresponding UL grant signal to wireless device 101 using, for instance, PDCCH 430 of first communication link 170. It is important to recognize that the scheduling of the transmission of a UL signal from wireless device 101 to second node 141 using second communication link 180 is determined by second node 141 but sent to wireless device 101 via first node 121 using, for instance, PDCCH 430 of first communication link 170.

In another embodiment, second node 141 can determine a UL power control signal associated with, for instance, PUSCH 320, PUCCH 460, other channel or any combination thereof transmitted by wireless device 101 to second node 141 using second communication link 180. Further, second node 141 can provide such UL power control signal to wireless device 101 via first node 121 using, for instance, backhaul channel 330 of third communication link 190 and PDCCH 430 of first communication link 170.

In another embodiment, transmission delay using backhaul channel 330 of third communication link 190 may require second node 141 to provide additional time for scheduling the transmission of a UL signal from wireless device 101 to second node 141 using second communication link 180. For example, second node 141 can schedule the transmission of a UL signal by a predetermined amount of time after second node 141 sends, for instance, a UL grant signal to wireless device 101 via first node 121, wherein the predetermined amount of time can correspond to, for instance, processing time, transmission delay, other delay, or any combination thereof.

In another embodiment, the resources associated with, for instance, an SRS signal, PUCCH 460, other channel, or any combination thereof can be allocated by second node 141 but delivered to wireless device 101 via first node 121. In this embodiment, wireless device 101 can provide a UL control signal to second node 141 using, for instance, PUCCH 460 of second communication link 180, wherein the UL control signal can include, for instance, a HARQ feedback signal, CQI signal, PMI signal, RI signal, SR signal, other signal or any combination thereof. For example, second node 141 can assign an SRS signal, PUCCH 460, other resource or any combination thereof for wireless device 101 and send such resource assignment to first node 141 using backhaul channel 330 of third communication link 190. First node 121 can then send the configuration of the HARQ feedback signal, CQI signal, PMI signal, RI signal, SR signal, other signal or any combination thereof to wireless device 101 using, for instance, DL RRC signaling, other signaling or both. To summarize, the resources for an SRS signal, PUCCH 460, other channel, or any combination thereof can be allocated by second node 141 and delivered to wireless device 101 via first node 121.

Figure 10:
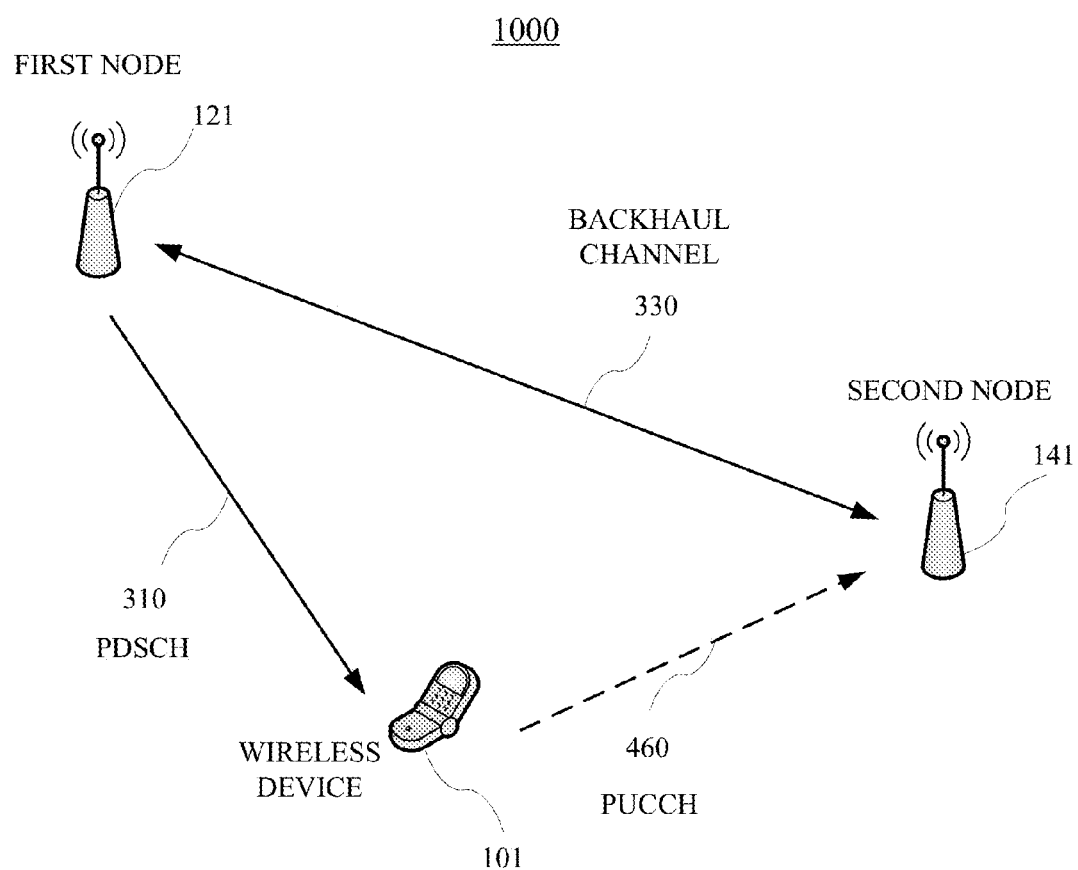
FIG. 10 illustrates another embodiment of a distributed control channel structure in a wireless communication system using multiple-serving nodes in accordance with various aspects set forth herein.

FIG. 10 illustrates another embodiment of distributed channel structure 1000 of system 100 in accordance with various aspects set forth herein. In this embodiment, first node 121 can transmit a DL data signal to wireless device 101 using first communication link 170. In response to such transmission, wireless device 101 can send a HARQ feedback signal to first node 121 via second node 141. First node 121 can then determine whether to re-transmit the DL data signal to wireless device 101. For example, first node 121 can transmit a DL data signal to wireless device 101 using, for instance, PDSCH 310 of first communication link 170. In response to such transmission, wireless device 101 can send a HARQ feedback signal to second node 141 using, for instance, PUCCH 460 of second communication link 180. Further, second node 141 can forward the HARQ feedback signal to first node 121 using backhaul channel 330 of third communication link 190. First node 121 can then determine whether to re-transmit the DL data signal to wireless device 101 using, for instance, PDSCH 310 of first communication link 170.

In another embodiment, transmission delay associated with forwarding a DL HARQ feedback signal such as an ACK/NAK signal from second node 121 to first node 141 using, for instance, backhaul channel 330 of third communication link 190 may require increasing the number of DL HARQ re-transmission procedure-related processes to optimize the use of available bandwidth. Further, the DL HARQ re-transmission procedure can support asynchronous re-transmission to allow, for instance, first node 121 to schedule a re-transmission of a DL signal for wireless device 101 upon receiving the forwarded DL HARQ feedback signal from second node 141.

In another embodiment, instead of using PHICH 470, a UL grant signal may be sent by first node 121 to wireless device 101 each time a re-transmission of a UL signal is required. Unlike the synchronous UL HARQ re-transmission procedure described in, for instance, LTE Release 8, wireless device 101 may not perform a re-transmission of a UL signal unless a re-transmission UL grant signal is received by wireless device 101 from first node 121. Wireless device 101 can transmit a UL signal to second node 141 after receiving a UL grant signal from second node 141 via first node 121. Upon receiving the UL signal, instead of sending a UL HARQ feedback signal such as an ACK/NACK signal to wireless device 101 via first node 121, second node 141 can send a new data indicator ("NDI") signal to wireless device 101 via first node 121 to indicate the scheduling for transmission of a new UL signal. For an unsuccessful transmission of a UL signal from wireless device 101, second node 141 can send a new UL grant signal to wireless device 101 via first node 121 to schedule UL re-transmission for wireless device 101. The UL grant signal can include a NDI signal, wherein the NDI signal can be used to indicate whether the UL grant signal is associated with a new transmission or a re-transmission of a UL signal. Further, a HARQ process identifier signal may be included with the UL grant signal. Such method can allow wireless device 101 to keep the UL signal in, for instance, memory 103, so that the UL signal is available for a UL HARQ re-transmission procedure-related process. Such memory may be re-used once a UL grant signal for a new data transmission is received using, for instance, PDCCH 430 of first transmission link 170. Further, avoiding the use of PHICH 470 via first communication link 170 can simplify the operation of first node 121 by not requiring it to configure and use PHICH 470 associated with the transmission of PUSCH 320.

In another embodiment, wireless device 101 can send to first node 121 via second node 141a PMI signal, CQI signal, RI signal, other signal or any combination thereof associated with the transmission of a DL signal from first node 121 to wireless device 101 via first communication link 170.

In another embodiment, for the transmission of a UL signal by wireless device 101 using second communication link 180, second node 141 can measure the channel quality using, for instance, the SRS signal received from wireless device 101. A person of ordinary skill in the art will recognize that there are many methods of measuring channel quality using a received reference signal. Using such channel quality measurement, second node 141 can determine an appropriate modulation and coding scheme ("MCS") for the transmission of a UL signal from wireless device 101. Further, second node 141 may include additional time for scheduling the transmission of a UL signal from wireless device 101 to compensate for any delay associated with second node 141 sending the associated UL grant signal to wireless device 101 via first node 121 using, for instance, backhaul channel 330 of third communication link 190. This may require second node 141 to perform the scheduling in advance and have a good estimation of the transmission delay on backhaul channel 330 of third communication link 190. Similarly, a TPC signal associated with the transmission of a UL control signal from wireless device 101 to second node 121 using, for instance, PUCCH 460, PUSCH 320 or both of second communication link 180 may be determined by second node 141 and sent to wireless device 101 via first node 121.

In another embodiment, first node 121 and second node 141 may be closely coupled using, for instance, backhaul channel 330 of third communication link 190. In such configuration, backhaul channel 330 of third communication link 190 may experience more traffic than independent control channel structure 400, 500, 600 and 700. In distributed control channel structure 800, a UL grant signal, TPC signal or both associated with PUSCH 320, PUCCH 460 or both may be transferred from second node 141 to first node 121 using, for instance, backhaul channel 330 of third communication link 190. In addition, a HARQ feedback signal, PMI signal, CQI signal, RI signal, other signal or any combination thereof may be transferred from second node 141 to first node 121 using, for instance, backhaul channel 330 of third communication link 190. In this embodiment, time delay in sending UL signals using, for instance, backhaul channel 330 of third communication link 190 may impact system performance. However, such time delay can be mitigated by using, for instance, a fiber optic cable between backhaul interface 128 of first node 121 and second node 141.

Due to separating UL and DL transmissions between first node 121 and second node 141, time synchronization issues between wireless device 101 and nodes 121 and 141 may occur. In one embodiment, nodes 121 and 141 may be time synchronized. Such requirement may be inherent to various industry standards such as LTE-A for a Type-I relay network. For example, as described in the LTE and LTE-A standards, coordinated multi-point ("CoMP") transmission, reception or both may require network time synchronization. CoMP transmission, reception or both can be used by LTE and LTE-A equipment to improve, for instance, data rates, cell-edge throughput, other benefit or any combination thereof. Further, such CoMP technique can be applied to multiple-serving node wireless communication system 100, since first node 121 is on the routing path and the data information, control information or both can be transmitted to second node 141 using, for instance, backhaul channel 330 of third communication link 190. In addition, as described in the LTE and LTE-A standards, multimedia broadcast multicast service ("MBMS") may require network time synchronization.

MBMS uses a plurality of base stations, RNs or both to broadcast the same information to a wireless device. MBMS may require a synchronized network so that a wireless device only needs to maintain time synchronization with one node.

In a synchronized network, wireless device 101 does not need to maintain separate time synchronization with first node 121 and second node 141. Such requirement can simplify the design of wireless device 101. For an unsynchronized network using independent control channel structure 400, 500, 600 and 700, wireless device 101 may need to maintain separate time synchronization with first node 121 and second node 141. For an unsynchronized network using distributed control channel structure 800, 900 and 1000, wireless device 101 may not need to maintain time synchronization with second node 141, since second node 141 may not transmit any DL signals to wireless device 101.

In an OFDM-based wireless communication system, cyclic prefix ("CP") may be added to an OFDM symbol to, for instance, reduce inter-symbol interference, maintain orthogonality amongst the sub-carriers or both. In an LTE system, there can be a normal CP and an extended CP, wherein the normal CP has a shorter length than the extended CP. LTE systems can use an extended CP to support, for instance, larger cell sizes, MBMS service, other benefit or any combination thereof. While the wireless propagation path between wireless device 101 and nodes 121 and 141 may comprise multiple-paths, the length of the normal CP, extended CP or both should be sufficient to support any delay between such multiple-paths, as specified for the LTE system.

In multiple-serving node wireless communication system 100, wireless device 101 may receive transmissions from both first node 121 and second node 141 at the RRC-Connected state. For such case, the same CP length may be applied to both nodes 121 and 141. Geometrically, first node 121 and second node 141 may be placed within the size of the donor cell. The multiple-path delay spread between wireless device 101 and first node 121 and wireless device 101 and second node 141 may be different but can be within the duration of the normal CP length or the extended CP length. Extended CP length can be used for nodes 121 and 141 to mitigate any concerns associated with larger multiple-path delay spread.

Latency in multiple-serving node wireless communication system 100 may impact quality of service ("QoS"). In system 100, latency may increase due to, for instance, using backhaul channel 330 of third communication link 190. In another embodiment, wireless device 101 may directly connect to first node 121 to transmit both DL and UL signals to reduce latency for a delay-sensitive network service. In this embodiment, first node 121 can be a base station and second node 141 can be an RN.

The control plane latency is typically determined as the transition time from idle state to active state. Even though multiple serving nodes may be used by wireless device 100, wireless device 100 may still need to use a random access procedure to connect to first node 121. In the case that wireless device 101 can only make channel quality measurements of DL transmissions from first node 121 during an idle state and may only try to connect to first node 121 with the strongest received power during a transition period. After the RRC connection is obtained, first node 121 may negotiate with second node 141 associated with the transmissions of a UL data signal and transition such UL transmissions to another node. Therefore, the control plane latency should not change for multiple-serving node wireless communication system 100.

The user plane latency can be defined as the one-way transit time between a session data unit ("SDU") packet being available at the internet protocol ("IP") layer in wireless device 101 and being available at the IP layer in node 121 and 141 or being available at the IP layer in node 121 and 141 and being available at the IP layer in wireless device 101. The user plane packet delay can include delay introduced by, for instance, associated protocols, control signalling or both. For independent control channel structure 400, 500, 600 and 700 in a multiple-serving node wireless communication system 100, there is no additional delay for wireless device 100 compared to wireless device 101 in a single-serving node wireless communication system. As discussed previously, two independent control channel structures 400, 500, 600 and 700 are maintained for first communication link 100 and second communication link 200 and no control signals are exchanged using communication link 300.

For distributed control channel structure 800, 900 and 1000, additional delay may occur due to, for instance, the frequent exchange of control signals between second node 141 and first node 121 via third communication link 190. Such delay may be caused by, for instance, sending control signals such as a HARQ feedback signal, CQI signal, PMI signal, RI signal, other control signal or any combination thereof to first node 121 or second node 141 and forwarding such signals to second node 141 or first node 121, respectively. For example, a 4 millisecond ("msec.") delay associated with sending a control signal from second node 141 to first node 121 and a 2 msec. delay associated with processing time at first node 121 may require increasing the packet round trip time ("RTT") from, for instance, eight msec. as specified by "LTE Release 8" to fourteen msec. Further, the number of HARQ processes can be increased to accommodate such increase in RTT so that nodes 121 and 141 do not need to wait for the HARQ feedback signal forwarded from the other node 121 and 141 before transmitting a new packet. If the packet is not received correctly by wireless device 101, first node 121 or second node 141, then the re-transmission can occur six msec. later than the re-transmission in a single-serving node system. In LTE Release 8, typically up to four re-transmissions are allowed for a voice over IP ("VoIP") service. For multiple-serving node wireless communication system 100, two re-transmissions may be allowed within such timing constraints. To minimize reliance on the reduced number of re-transmissions, for instance, a more conservative MCS for the initial transmission by wireless device 101 can be used so that the packet can be received correctly with higher probability for the initial transmission.

In summary, splitting the reception of DL and UL transmissions from wireless device 101 between first node 121 and second node 141 should not incur additional control channel delay if independent control channel structure 400, 500, 600 and 700 is used. On the other hand, if distributed control channel structure 800, 900 and 1000 is used, the number of maximum re-transmissions allowed within a certain period can be reduced. More conservative MCS selection may be considered for the initial transmission in this case.

In another embodiment, wireless device 101 may be operated in conditions such that handoffs, handovers or both may affect its connection to first node 121, second node 141 or both. For example, wireless device 101 may be required to handoff from first node 121 to another node, which would change, for instance, the source of the DL data signal from first node 121 to another node. Similarly, wireless device 101 may be required to handoff from second node 141 to another node, which would change, for instance, the source of the UL data signal from second node 141 to another node. Further, wireless device 101 may be required to handoff from first node 121 and second node 141 to different target nodes. Various handoff scenarios exist for wireless device 101 in system 100. For instance, wireless device 101 can handoff from second node 141 to another second node, and can maintain its connection with first node 121. Wireless device can handoff from first node 121 to another first node, and can maintain its connection with second node 141. Wireless device 101 can handoff from second node 141 to first node 121. Wireless device 101 can handoff from first node 121 to second node 141. Wireless device 101 can handoff from first node 121 to another first node and can handoff from second node 141 to another second node. Wireless device 101 can handoff from first node 121 and second node 141 to the same serving node. First node 121, second node 141 or both may need to indicate to wireless device 101 which node will be handed-off. This could be signalled via high layer signalling such as RRC signalling. Further, more coordination may be required when wireless device 101 simultaneously or contemporaneously handoffs first node 121 and second node 141.

Figure 11:
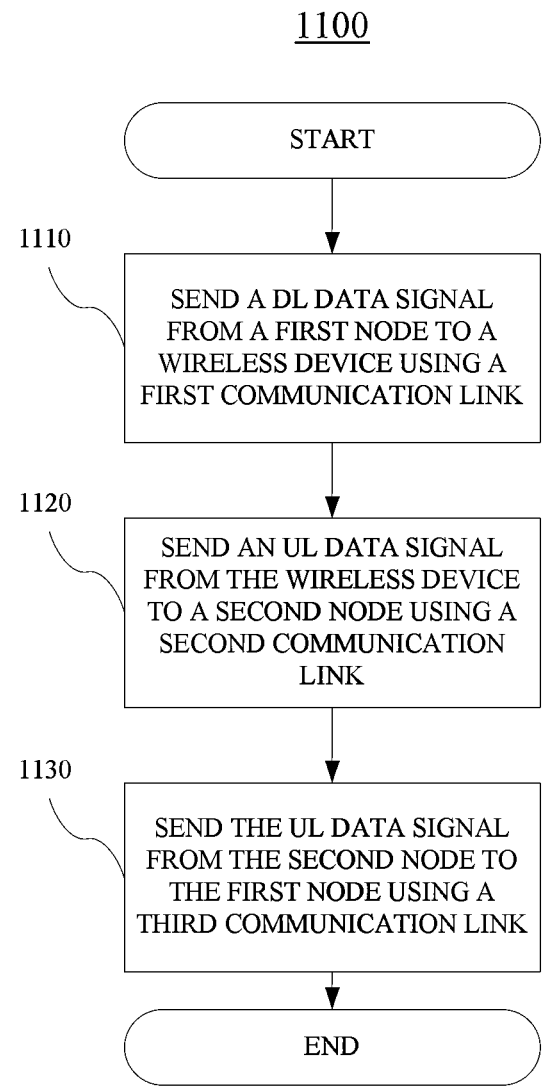
FIG. 11 is a flow chart of one embodiment of a method of providing data signals in a wireless communication system using multiple-serving nodes in accordance with various aspects set forth herein.

FIG. 11 is a flow chart of one embodiment of a method of providing data signals in system 100 in accordance with various aspects set forth herein. In FIG. 11, method 1100 can start at, for instance, block 1110, where method 1100 can send a DL data signal from first node 121 to wireless device 101 using first communication link 170. At block 1120, method 1100 can send a UL data signal from wireless device 101 to second node 141 using second communication link 180. At block 1130, method 1100 can send the UL data signal from second node 141 to first node 121 using third communication link 190.

Figure 12A:
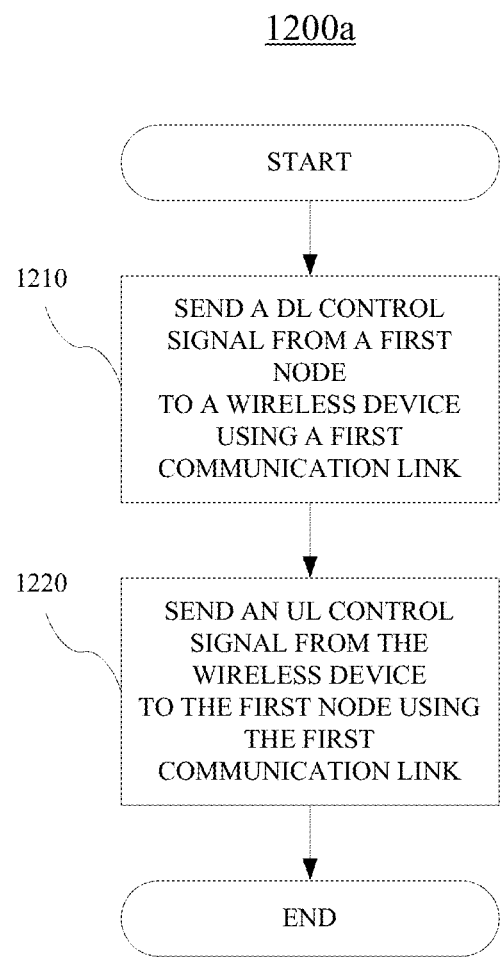
FIG. 12A is a flow chart of one embodiment of a method of providing control signals between a first node and a wireless device in a wireless communication system using multiple-serving nodes in accordance with various aspects set forth herein.

FIG. 12A is a flow chart of one embodiment of method 1200a of providing control signals between first node 121 and wireless device 101 in system 100 in accordance with various aspects set forth herein. In FIG. 12A, method 1200a can start at, for instance, block 1210, where method 1200a can send a DL control signal from first node 121 to wireless device 101 using first communication link 170, wherein the DL control signal may include, for instance, a DL grant signal, other control signal or both. At block 1220, method 1200a can send a UL control signal from wireless device 101 to first node 121 using first communication link 170, wherein the UL control signal can include, for instance, an ACK/NACK signal, CQI signal, PMI signal, RI signal, other control signal or any combination thereof.

Figure 12B:
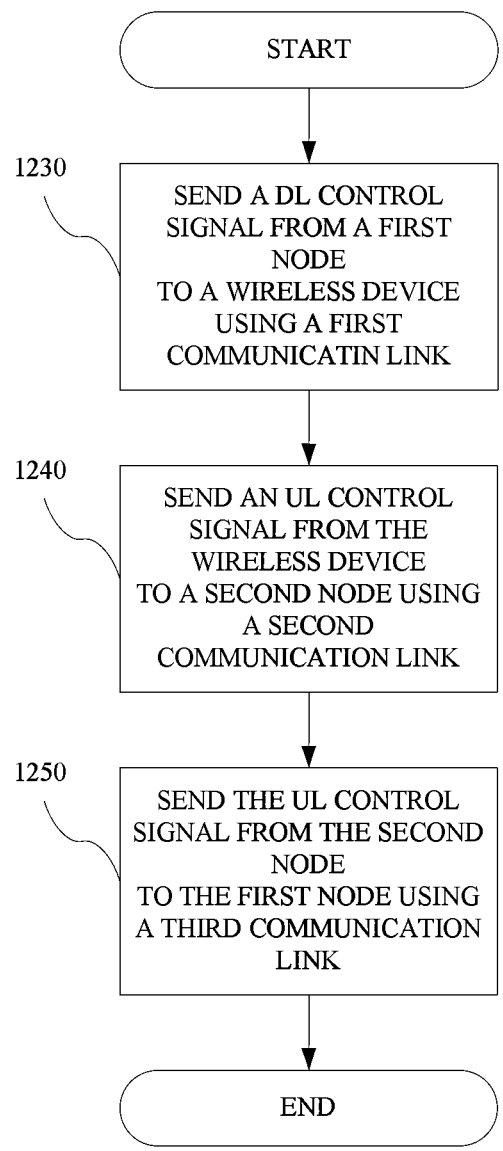
FIG. 12B is a flow chart of another embodiment of a method of providing control signals between a first node and a wireless device in a wireless communication system using multiple-serving nodes in accordance with various aspects set forth herein.

FIG. 12B is a flow chart of another embodiment of method 1200b of providing control signals between first node 121 and wireless device 101 in system 100 in accordance with various aspects set forth herein. In FIG. 12B, method 1200b can start at, for instance, block 1230, where method 1200b can send a DL control signal from first node 121 to wireless device 101 using first communication link 170, wherein the DL control signal may include, for instance, a DL grant signal, other control signal or both. At block 1240 and block 1260, method 1200b can send a UL control signal from wireless device 101 to first node 121 via second node 141, wherein the UL control signal can include, for instance, an ACK/NACK signal, CQI signal, PMI signal, RI signal, other control signal or any combination thereof. At block 1240, method 1200b can send the UL control signal from wireless device 101 to second node 141 using second communication link 170. At block 1250, method 1200b can send the UL control signal from second node 141 to first node 121 using third communication link 190.

Figure 13A:
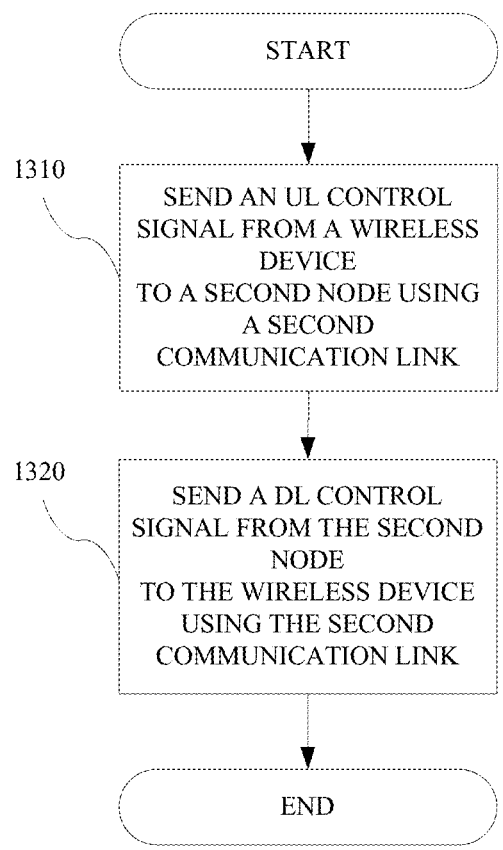
FIG. 13A is a flow chart of one embodiment of a method of providing control signals between a second node and a wireless device in a wireless communication system using multiple-serving nodes in accordance with various aspects set forth herein.

FIG. 13A is a flow chart of one embodiment of method 1300a of providing control signals between second node 141 and wireless device 101 in system 100 in accordance with various aspects set forth herein. In FIG. 13A, method 1300a can start at, for instance, block 1310, where method 1300a can send a UL control signal from wireless device 101 to second node 141 using second communication link 180, wherein the UL control signal may include an SR signal, SRS signal, other control signal or any combination thereof. At block 1320, method 1300b can send a DL control signal from second node 141 to wireless device 101 using second communication link 180, wherein the DL control signal may include a UL grant signal, ACK/NACK signal, TPC signal, other control signal or any combination thereof.

Figure 13B:
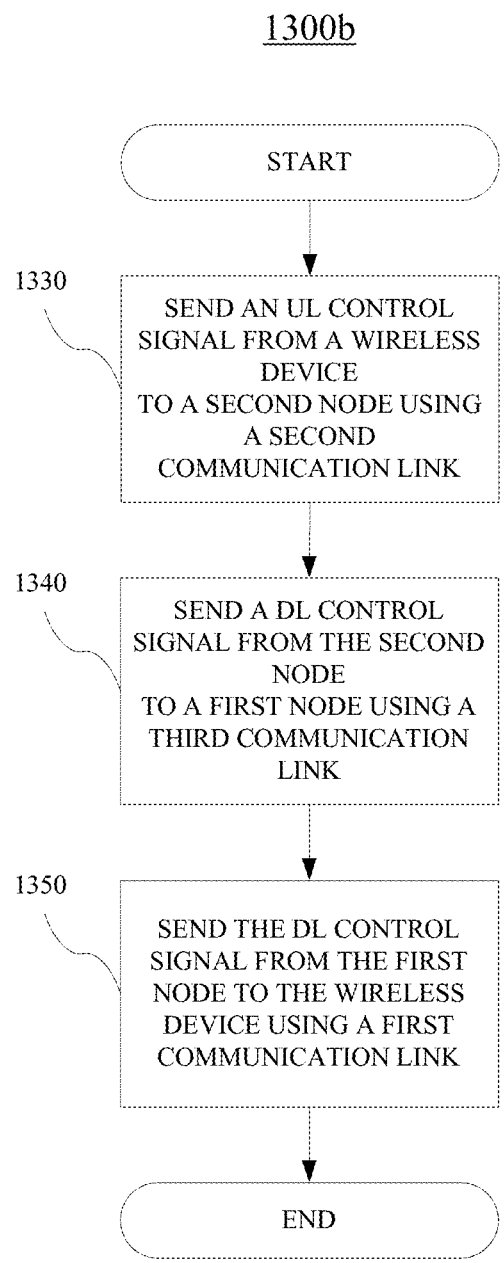
FIG. 13B is a flow chart of another embodiment of a method of providing control signals between a second node and a wireless device in a wireless communication system using multiple-serving nodes in accordance with various aspects set forth herein.

FIG. 13B is a flow chart of another embodiment of method 1300b of providing control signals between second node 141 and wireless device 101 in system 100 in accordance with various aspects set forth herein. In FIG. 13B, method 1300b can start at, for instance, block 1330, where method 1300b can send a UL control signal from wireless device 101 to second node 141 using second communication link 180, wherein the UL control signal may include an SR signal, SRS signal, other control signal or any combination thereof. At block 1340 and block 1350, method 1300b can send a DL control signal from second node 141 to wireless device 101 via first node 121, wherein the DL control signal may include, for instance, a UL grant signal, ACK/NACK signal, TPC signal, other signal or any combination thereof. At block 1340, method 1300b can send the DL control signal from second node 141 to first node 121 using third communication link 190. At block 1350, method 1300b can send the DL control signal from first node 121 to wireless device 101 using first communication link 170.

Having shown and described exemplary embodiments, further adaptations of the methods, devices and systems described herein may be accomplished by appropriate modifications by one of ordinary skill in the art without departing from the scope of the present disclosure. Several of such potential modifications have been mentioned, and others may be apparent to those skilled in the art. For instance, the exemplars, embodiments, and the like discussed above are illustrative and are not necessarily required. Accordingly, the scope of the present disclosure should be considered in terms of the following claims and is understood not to be limited to the details of structure, operation and function shown and described in the specification and drawings.

As set forth above, the described disclosure includes the aspects set forth below.

What is claimed is:

1. A method of wireless communication, comprising:
sending from a first node a downlink control signal originating from the first node directly to a wireless device using a first communication link;
sending from said first node a downlink data signal directly to said wireless device using said first communication link;
receiving by said first node an uplink control signal indirectly from said wireless device via a second node using a third communication link, said uplink control signal associated with said downlink data signal;
receiving by said first node another downlink control signal originated by said second node directly from said second node, wherein said another downlink control signal includes information scheduling an uplink transmission from said wireless device to said second node using a second communication link; and
forwarding by said first node said another downlink control signal received from said second node via said third communications link to said wireless device using said first communication link.

2. The method of claim 1, further comprising:
receiving by said first node an uplink data signal indirectly from said wireless device via said second node using said third communication link.

3. The method of claim 1, wherein said downlink data signal and said another downlink control signal are multiplexed onto a physical downlink shared channel ("PDSCH") of said first communication link.

4. The method of claim 1, wherein said downlink control signal includes at least one of a downlink grant signal, an uplink grant signal, a timing adjustment signal and a transmission power control ("TPC") signal; and
wherein said another downlink control signal includes at least one of a downlink grant signal, an uplink grant signal, a timing adjustment signal and a transmission power control ("TPC") signal.

5. The method of claim 1, wherein said first communication link includes at least one of a physical downlink shared channel ("PDSCH"), a physical downlink control channel ("PDCCH"), and a physical hybrid automatic repeat request indicator channel ("PHICH").

6. The method of claim 1, wherein said first node and said second node are time synchronized.

7. A method of wireless communication, comprising:
sending from a first node a downlink data signal directly to a wireless device using a first communication link, the downlink data signal originating from said first node;
receiving by said first node an uplink data signal indirectly from said wireless device via a second node using a third communication link;
receiving by said first node an uplink control signal indirectly from said wireless device via said second node, said uplink control signal in response to said downlink data signal;
receiving by said first node another downlink control signal originated from said second node directly from said second node, wherein said another downlink control signal includes information scheduling an uplink transmission from said wireless device to said second node using a second communication link; and
sending from said first node said downlink control signal directly to said wireless device using said first communication link.

8. A method of wireless communication, comprising:
sending from a first node a downlink data signal originated by said first node directly to a wireless device using a first communication link;
forwarding by a second node an uplink data signal received from said wireless device using a second communication link to said first node using a third communication link;
sending from said second node a downlink control signal originated by said second node indirectly to said wireless device via said first node using said third communication link, wherein said downlink control signal includes information scheduling an uplink transmission from said wireless device to said second node using said second communication link; and
receiving by said second node an uplink control signal directly from said wireless device using said second communication link, said uplink control signal related to said downlink data signal.

9. The method of claim 8, wherein said uplink data signal and said uplink control signal are multiplexed onto a physical uplink shared channel ("PUSCH") of said second communication link.

10. The method of claim 8, wherein said downlink control signal includes at least one of a downlink grant signal, an uplink grant signal, a timing adjustment signal and a transmission power control ("TPC") signal.

11. The method of claim 8, wherein said second communication link includes at least one of a physical uplink shared channel ("PUSCH"), a physical uplink control channel ("PUCCH") and a physical hybrid automatic repeat request indicator channel ("PHICH").

12. A node for wireless communication, comprising:
a processor coupled to a memory containing processor-executable instructions, wherein said processor is operable to:
send a downlink control signal originated by said node directly to a wireless device using a first communication link;
send a downlink data signal directly to said wireless device using said first communication link;
receive an uplink control signal indirectly from said wireless device via another node using a third communication link, said uplink control signal associated with said downlink data signal;
receiving another downlink control signal originated from said another node directly from said another node, wherein said another downlink control signal includes information scheduling an uplink transmission from said wireless device to said second node using a second communication link; and
forward said another downlink control signal received from said another node via said third communication link directly to said wireless device using said first communication link.

13. A node for wireless communication, comprising:
a processor coupled to a memory containing processor-executable instructions, wherein said processor is operable to:
send a downlink data signal originated from said node directly to a wireless device using a first communication link;
receive a second downlink control signal originated from said second node directly from said second node, wherein said another downlink control signal includes information scheduling an uplink transmission from said wireless device to said second node using a second communication link;
send said second downlink control signal directly to said wireless device using said first communication link; and
receive an uplink control signal indirectly from said wireless device via said second node, said uplink control signal related to said downlink data signal.

14. A relay node for wireless communication, comprising:
a processor coupled to a memory containing processor-executable instructions, wherein said processor is operable to:
send a downlink control signal indirectly to a wireless device via another node using a third communication link, wherein said downlink control signal includes information scheduling an uplink transmission from said wireless device to the node using a second communication link;
receive an uplink control signal directly from said wireless device using a second communication link; and
forward the uplink control signal received from said wireless device via said second communication link to said another node using said third communication link.

15. The relay node of claim 14, wherein said processor is further operable to:

forward an uplink data signal received from said wireless device via a second communications link to said another node using said third communication link.

* * * * *

UNITED STATES PATENT AND TRADEMARK OFFICE
CERTIFICATE OF CORRECTION

PATENT NO.         : 8,619,795 B2
APPLICATION NO.    : 12/759422
DATED              : December 31, 2013
INVENTOR(S)        : Yi Yu et al.

Page 1 of 1

It is certified that error appears in the above-identified patent and that said Letters Patent is hereby corrected as shown below:

In the Claims

Column 18, Claim 13, Line 39 replace "link;" with -- "link; receive an uplink data signal indirectly from said wireless device via a second node using a third communication link;" --

Signed and Sealed this
Nineteenth Day of August, 2014

Michelle K. Lee
*Deputy Director of the United States Patent and Trademark Office*